United States Patent [19]

Brinker et al.

[11] Patent Number: 4,825,376

[45] Date of Patent: Apr. 25, 1989

[54] CONTROLLER FOR GLASS SHEET PROCESSING SYSTEM

[75] Inventors: Gary D. Brinker, Perrysburg; Jeffrey N. Klopping, Toledo; Eric D. Fintel, Genoa, all of Ohio

[73] Assignee: Glasstech International L.P., Dover, Del.

[21] Appl. No.: 856,060

[22] Filed: Apr. 17, 1986

[51] Int. Cl.⁴ .................. G06F 15/46; C03B 35/00
[52] U.S. Cl. .................. 364/473; 364/183; 364/185; 364/474.09; 364/474.35; 364/132; 364/167.01; 65/160; 65/DIG. 13
[58] Field of Search ........... 364/473, 132, 469, 171, 364/472, 476, 474, 167, 183, 184, 185; 65/160, 163, DIG. 13; 318/563, 565

[56] References Cited

U.S. PATENT DOCUMENTS

| | | | |
|---|---|---|---|
| 3,626,165 | 12/1971 | McCall | 364/473 |
| 4,150,326 | 4/1979 | Engelberger et al. | 318/563 |
| 4,319,320 | 3/1982 | Sato et al. | 364/132 |
| 4,402,721 | 9/1983 | Ericson et al. | 364/473 |
| 4,431,436 | 2/1984 | Lulejian | 364/473 |
| 4,432,064 | 2/1984 | Barker et al. | 364/132 |
| 4,459,146 | 7/1984 | Farkas et al. | 364/473 |
| 4,459,655 | 7/1984 | Willemin | 364/171 |
| 4,475,937 | 10/1984 | Nitschke | 364/469 |
| 4,524,313 | 6/1985 | Kuno et al. | 364/184 |
| 4,542,471 | 9/1985 | Inaba et al. | 364/185 |
| 4,598,379 | 7/1986 | Awane et al. | 364/132 |
| 4,651,601 | 3/1987 | Sasaki | 364/475 |
| 4,682,089 | 7/1987 | Tamasi | 318/563 |
| 4,698,991 | 10/1987 | Kinji et al. | 364/476 |
| 4,705,552 | 11/1987 | Liska et al. | 65/163 |

Primary Examiner—John R. Lastova
Attorney, Agent, or Firm—Brooks & Kushman

[57] ABSTRACT

A controller for use in connection with a central control for a glass sheet processing system including an operator interface and a master computer, the controller including a slave computer, a port for two-way communication of data signals between the master computer and the slave computer, a position encoder corresponding to each of the movable components monitored by the controller, and a port for communicating a digital signal representative of the position of the movable component, issued by the position encoder, to the slave computer. The slave computer includes logic for receiving position information from the position encoders and continuously comparing this information to preselected position parameters downloaded from the master computer to determine whether an unsafe condition exists, sending a signal for deactivating the power switch to the drives for the affected components, and sending an error condition message back to the master computer.

10 Claims, 6 Drawing Sheets

CONTROLLER FOR GLASS SHEET PROCESSING SYSTEM

TECHNICAL FIELD

This invention relates generally to controls for glass sheet processing systems, and more particularly to a modular computer control and communication interface system used in connection with the central control of a glass sheet processing system.

BACKGROUND ART

Glass sheet processing systems such as the type disclosed by U.S. Pat. No. 4,575,390 include bending apparatus having one or more molds adapted to be positioned within a heating chamber and receive a heated glass sheet from a roller conveyor in preparation for tempering and/or bending.

Briefly, the glass processing system typically includes a furnace defining a heating chamber through which glass sheets are conveyed for heating in preparation for bending. The bending apparatus of the preferred system includes a roller conveyor for supplying heated glass to one or more curved molds. The curved molds are each typically mounted for movement along a single axis, and typically take the shape of a surface having a complex curvature that is generally convex in nature (mold) or a complimentary concave surface in the form of an open center ring (ring). The heated glass is formed by placing the sheet in a series of on a mold and moving the mold(s) relative to the glass to provide an accurately formed curvature according to a preselected design.

Relatively quick and accurate positioning of the curved molds during various stages of the bending and tempering process is an important factor in achieving a high quality product.

The travel of the mold and rings is typically restricted by electro-mechanical limit switches These limit switches are activated when the shuttle upon which the mold or ring is mounted contacts or passes the limit switch, resulting in immediate cutoff of the power to the drive for that shuttle. These limit switches are an important feature because they avoid the potential damage that might occur if one of the relatively large mold or ring shuttles were to exceed its desired travel limits. However, one disadvantage of limit switches is that, once mounted on the machine, the travel limits of a particular mold or ring cannot be changed unless the limit switches are moved. Also, the limit switches and associated hardware are relatively costly items.

SUMMARY OF THE INVENTION

One object of the present invention is to provide a controller for controlling and monitoring conditions in a glass sheet processing system, such as the status of various switches and location of various movable components. Another object of the present invention is to provide a controller capable of receiving and storing data corresponding to preselected position parameters, such as travel limits and potential interference locations for the movable components in the glass sheet processing system, wherein said data is downloaded from a master computer in the central control system at setup time or at any time during the operation of the system.

A further object of the present invention is to provide a controller including a slave computer having logic for continuously monitoring the positions of preselected components in a glass sheet processing system, comparing these positions to programmed parameters, issuing warning signals in the event of the detected imminence of an overtravel or interference, and an automatic power cutoff for the drive of the affected components.

It is yet another object of the present invention to provide a controller including a slave computer having communication means such as an RS-232 serial port for receiving information relating to various preselected conditions in the glass sheet processing system, and logic means for issuing warnings to the master computer in the central control system when certain conditions have been detected.

The controller system of the present invention is adapted for use with a master computer having supervisory control and monitoring of the various conditions in the glass processing system, includes a slave computer, in the form of a programmable microprocessor, two-way communication means for receiving preselected travel limits for various preselected movable components in the glass processing system, memory for storing this data, one or more position encoders, each for monitoring the position of a movable component in the system, an input to the slave computer for providing digital signals from each of the position encoders, a switch for controlling the power to the drives for each of the movable components being monitored, logic for continuously monitoring the position of each of the selected movable components to determine whether an overtravel or interference condition is imminent, and logic for sending a warning signal to the master computer and cutting off power to the drives of the affected components upon determination of the imminence of an overtravel or interference condition.

The slave computer also includes logic for monitoring digital inputs that represent various selected external events, such as the condition of various switches on the system, and the status of components which may be in an open or closed position at any time.

It will be appreciated by those skilled in the art that the controller of the present invention provides several advantages over the prior art. First, the placement of existing electro-mechanical limit switches with programmable software limit switches results in a reduction of the amount of hardware required to monitor the system. Second, the ability to program desired travel limits for each of the movable components provides the flexibility of quickly changing the system with a minimum of mechanical setup.

Other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
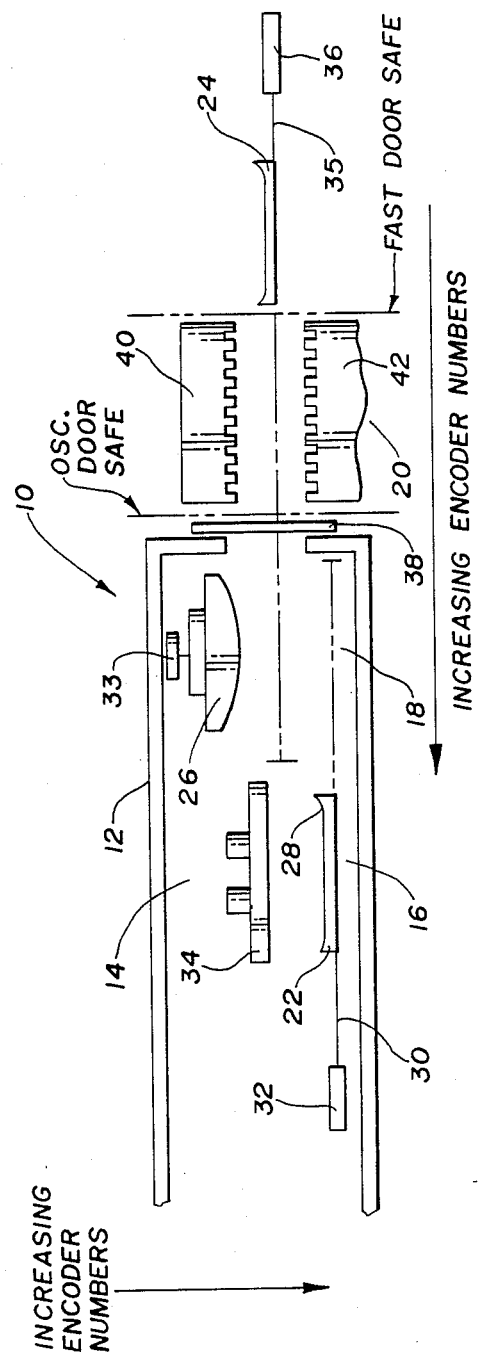
FIG. 1 illustrates one type of glass sheet processing system which might employ the controller of the present invention.

Referring to FIG. 1, a glass sheet processing system indicated generally by reference number 10 includes a schematically indicated furnace 12 having a heating chamber 14 within which glass sheets are heated and bent.

The glass sheet processing system 10 also typically includes one or more forming stations 16, 18, and a quench station 20. The forming stations may include one or more curved molds 22-26. Two of the curved molds 22, 24, shown in FIG. 1, are of a peripheral ring type having an open center and shall hereinafter be referred to generally as rings. The curved surface 28 of the rings 22, 24, has a generally concave shape in an upwardly facing direction. Ring 22 is mounted upon a shuttle schematically shown at 30 which is driven by a drive 32 for horizontal movement from positions generally beneath a float rock 34 and mold 26. This ring 22, referred to hereinafter as the hot ring 22, typically remains in the furnace 12 during processing. Ring 24 is similarly mounted upon a shuttle 34 and driven by a variable speed drive 36 for horizontal movement from a position clear of the quench station 20, where the formed glass sheet may be removed from the ring 24 and taken by conveyor (not shown) to an unloading point. This ring 24, hereinafter referred to as the cold ring 24, typically moves into the furnace 12 through a movable door 38, under the mold 26, back out of the furnace 12, into the quench station 20, and clear of the quench station 20 to the position shown in FIG. 1, on a periodic basis during processing.

The mold 26 is mounted for vertical movement within the furnace 12 from the clear position shown in FIG. 1 into contact with either the hot ring 22 or the cold ring 24 at various times during the process.

The quench station 20 typically includes a pair of clam shells 40, 42 mounted for movement in a vertical direction from a generally open position, shown in FIG. 1, to a closed position surrounding the cold ring 24 during the quench cycle.

Additional details of this glass sheet processing system are disclosed in U.S. Pat. No. 4,575,390, which is hereby incorporated by reference. Other glass processing systems employing movable molds and/or other components which are required to move to preselected points at variable speeds might also employ the controller of the present invention.

It should be noted that the values of the incremental portion encoders 62-66 are assumed to increase as the hot ring 22 and cold ring 24 move farther into the furnace 12 (or from right to left in the FIGS.) and increase when the mold 26 moves in a downward direction.

Figure 2:
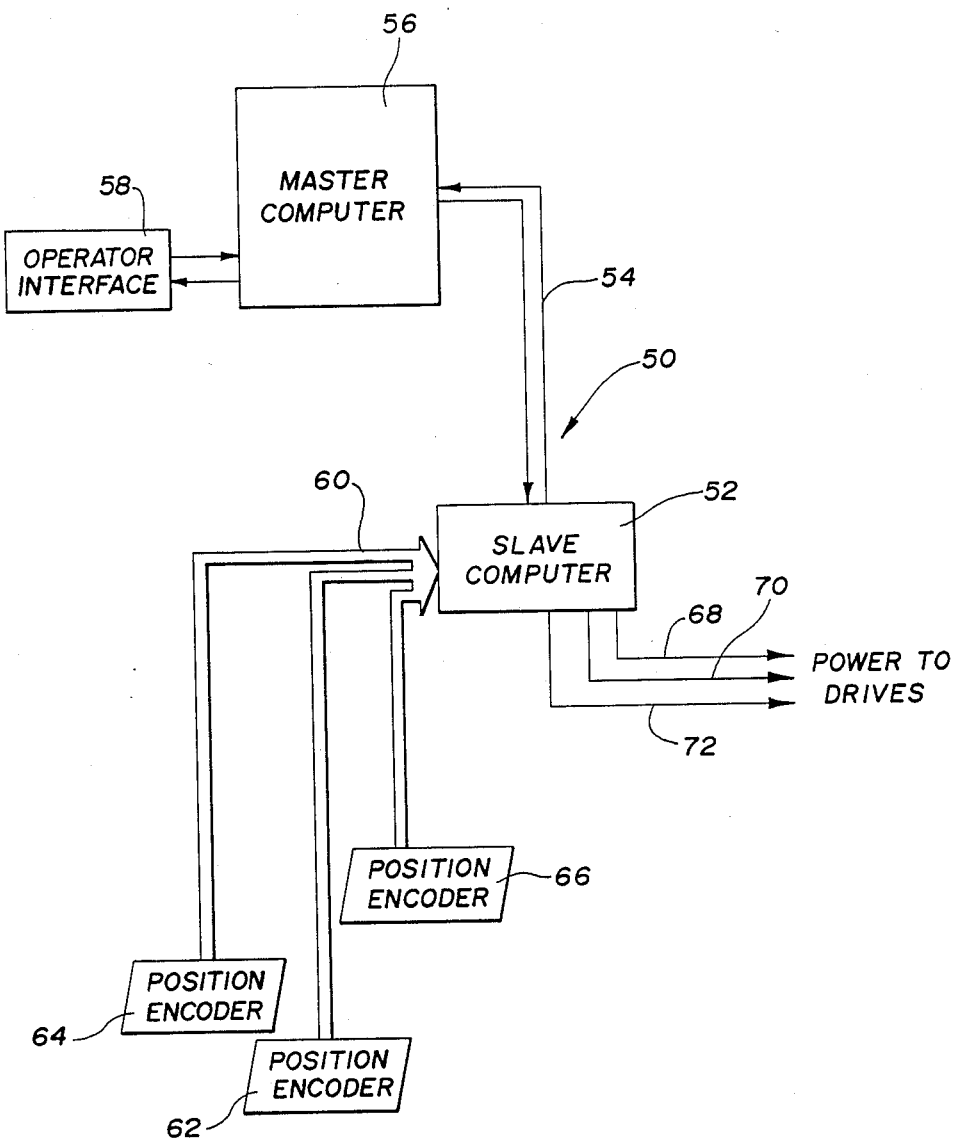
FIG. 2 is a block diagram of the controller of the present invention.

Referring to FIG. 2, the controller, generally referred to as 50, includes a slave computer 52, two-way communication ,means) 54 for communicating with a master computer 56 and/or an operator interface 58.

The master computer 56 and operator interface 58 are typically components in a central control system for the glass sheet processing system. 15 The controller 50 also includes first input means 60 for receiving digital data from each of a series of incremental position encoders 62-66, and a plurality of switches 68-72, associated with each of the drives of the movable components monitored with the system for enabling the slave computer to disconnect the drives in the event of a detected overtravel or interference condition.

The slave computer 52 includes a microprocessor, static random access memory (RAM), and at least three communication ports, preferably in the form of a serial RS-232-C port 54 for communicating with the master computer 56, and parallel ports 60 for communicating with the incremental position encoders 62-66. A suitably programmed MIKUL 6809-4 monocard microcomputer, manufactured by TL Industries, Inc., Norwood, Ohio, is preferably employed this purpose. The MIKUL 6809-4 has a Motorola 6809 microprocessor, serial RS-232-C port, four parallel I/O ports, a real time clock, up to 4K bytes of static RAM, and up to 32K bytes of EPROM.

The slave computer 52 is preferably driven by a master computer 56 which is connected for two-way communication by the RS-232-C serial port 54. The master computer 56 is also preferably a MIKUL 6809-4 monocard microcomputer and is suitably programmed to monitor various selected conditions in the glass sheet processing system, such as current temperatures and current positions of other movable components (with the aid of information received from position controllers controlling these components). The master computer 56 also serves as the receptor of operator input via a suitable operator interface 58, such as a conventional data input terminal or other data input device.

Through direct operator input, or as a result of a preprogrammed action, the master computer 56 may download a series of parameters generally including the travel limits of each of the movable components monitored by the controller, and the potential interference zones for these components.

It will be appreciated, however, that the controller of the present invention can operate independent of the central control system providing the necessary parameters have been programmed into the slave computer 52.

Figure 3:
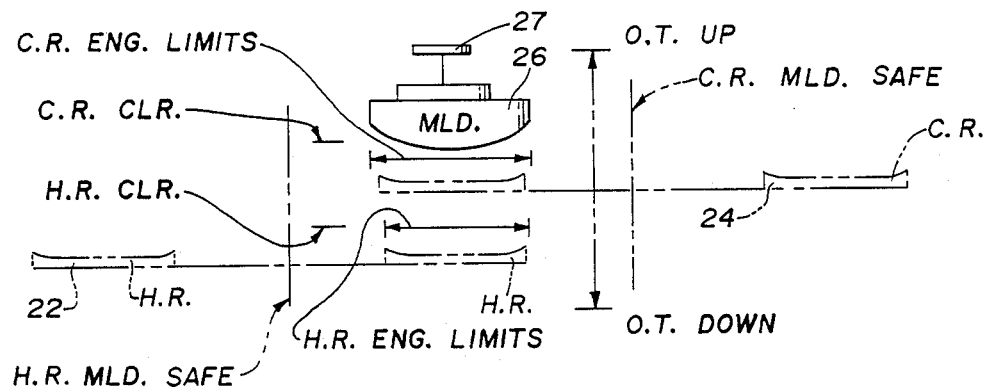
FIG. 3 is a schematic illustration of the mold parameters monitored by the controller of the present invention.
Figure 4:
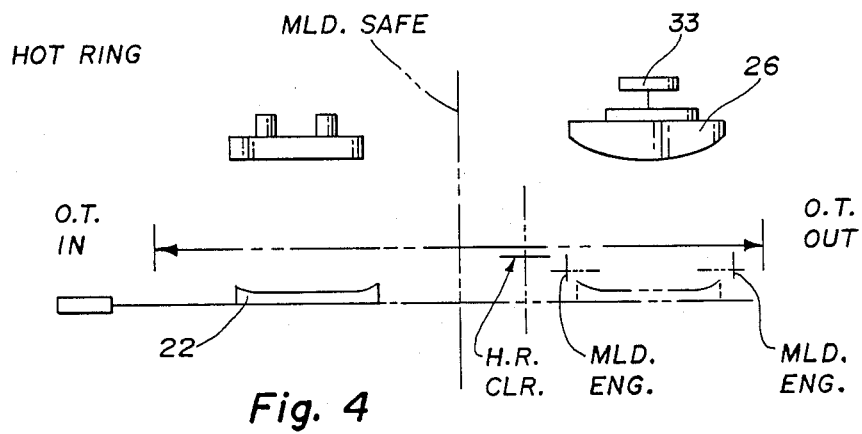
FIG. 4 is a schematic of the hot ring parameters monitored by the controller of the present invention.
Figure 5:
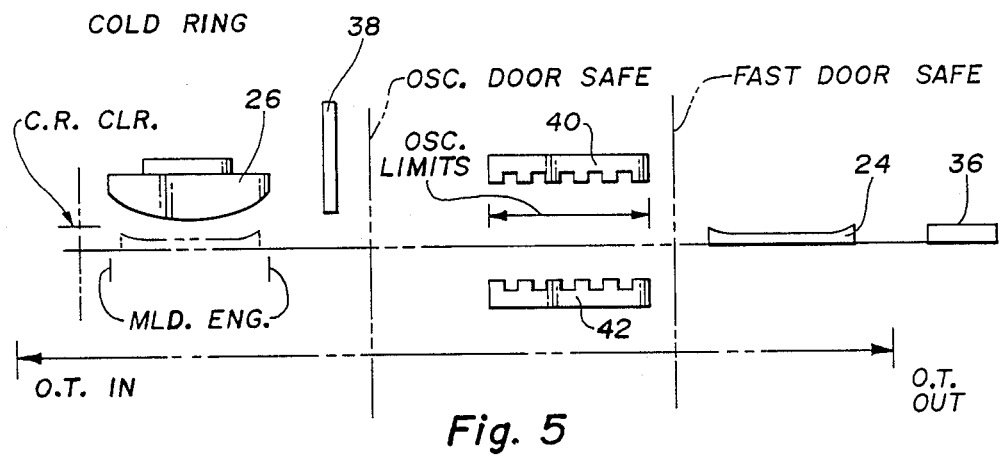
FIG. 5 is a schematic of the cold ring parameters monitored by the controller of the present invention.

FIGS. 3-5 schematically illustrate the various components monitored in the preferred embodiment of the present invention—the hot ring 22, the cold ring 24 and the mold 26. The status of the furnace door 38 and the clam shell quench 40, 42 (opened or closed) are also monitored.

Figure 6:
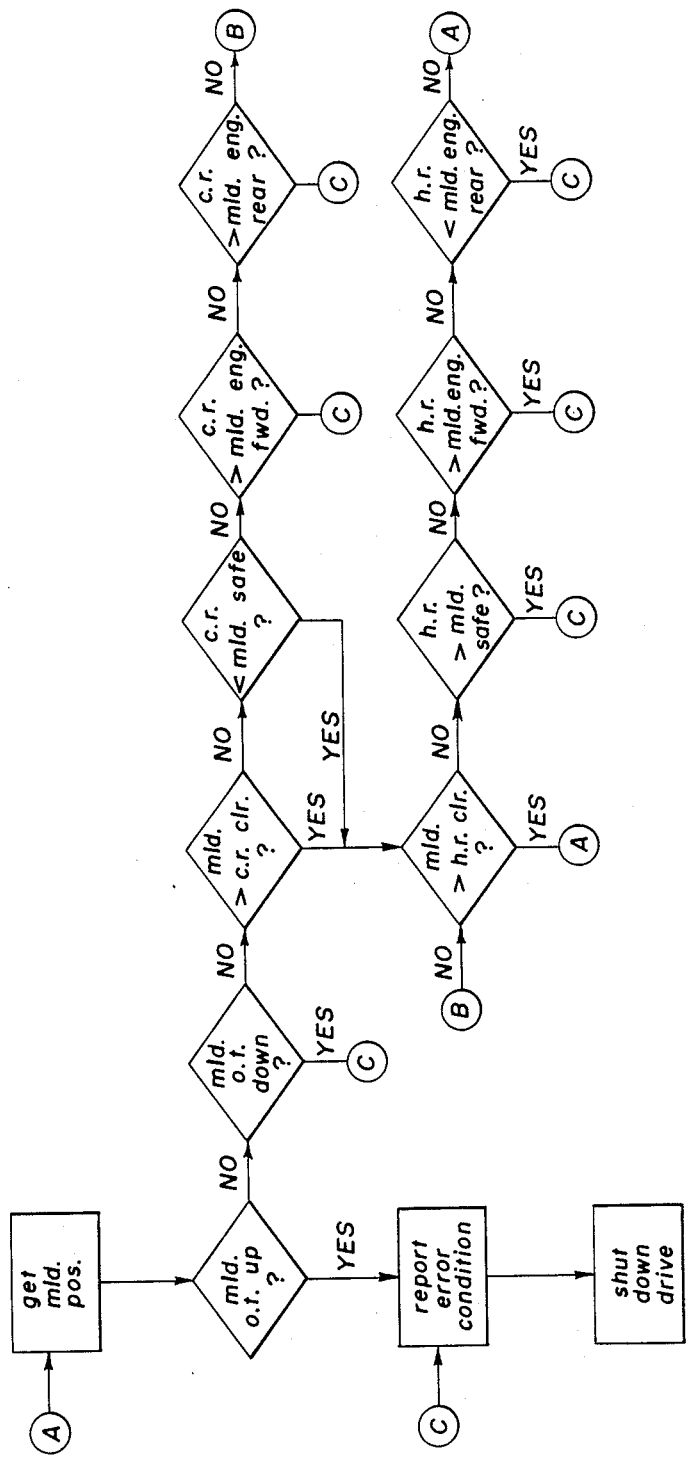
FIG. 6 is a flow chart detailing the basic functions performed by the controller in monitoring potential mold overtravel and interference conditions.

Referring to FIGS. 3 and 6, the particular programmable limits monitored in connection with the mold 26 preferably include the over-travel up limit, over-travel down limit, cold ring engage limits, hot ring engage limits, cold ring clearance, hot ring clearance, cold ring mold safe position, and hot ring mold safe position. As shown in greater detail in FIG. 6, these mold crash conditions are continuously monitored by the slave computer 52 during operation of the glass sheet processing system. Values for each of the limits may be programmed at any time by downloading data corresponding to these parameters from the master computer 56.

If the incremental position encoder for the mold 26 indicates at any time that the position of the mold has exceeded either the over-travel up or over-travel down positions, the system will immediately report the error condition to the master computer 56 and will shut down the drive 27 for the mold.

Similarly, if the mold 26 is positioned below the cold ring clearance and the cold ring 24 is simultaneously positioned inside (to the left of) the cold ring mold safe position, the slave 52 then checks to ensure that the cold ring 24 is within the cold ring engage limits for engagement with the mold 26. If the cold ring 24 is not within the cold ring engage limits, the slave computer 52 reports an error condition to the master computer 56 and disconnects the power to the drives for the mold 26 and the cold ring 24.

Figure 7:
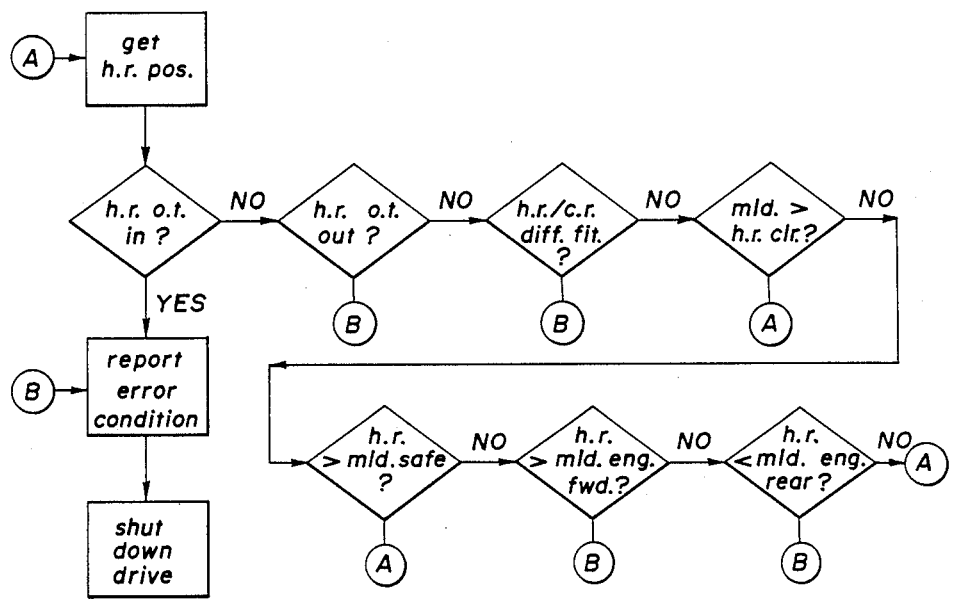
FIG. 7 is a flow chart detailing the functions performed by the controller of the present invention in monitoring the potential hot ring overtravel and interference conditions.

Referring to FIGS. 4 and 7, the system similarly monitors the positions of the hot ring 22 and if the mold 26 is below the hot ring clearance and the hot ring clearance is within (to the right of) the hot ring mold safe position, the system checks to ensure that the hot ring is within the hot ring engage limits. If not, the system again reports an error condition to the master computer 56 and disconnects the power to the drives to the mold 26 and hot ring 22 drives.

Figure 8:
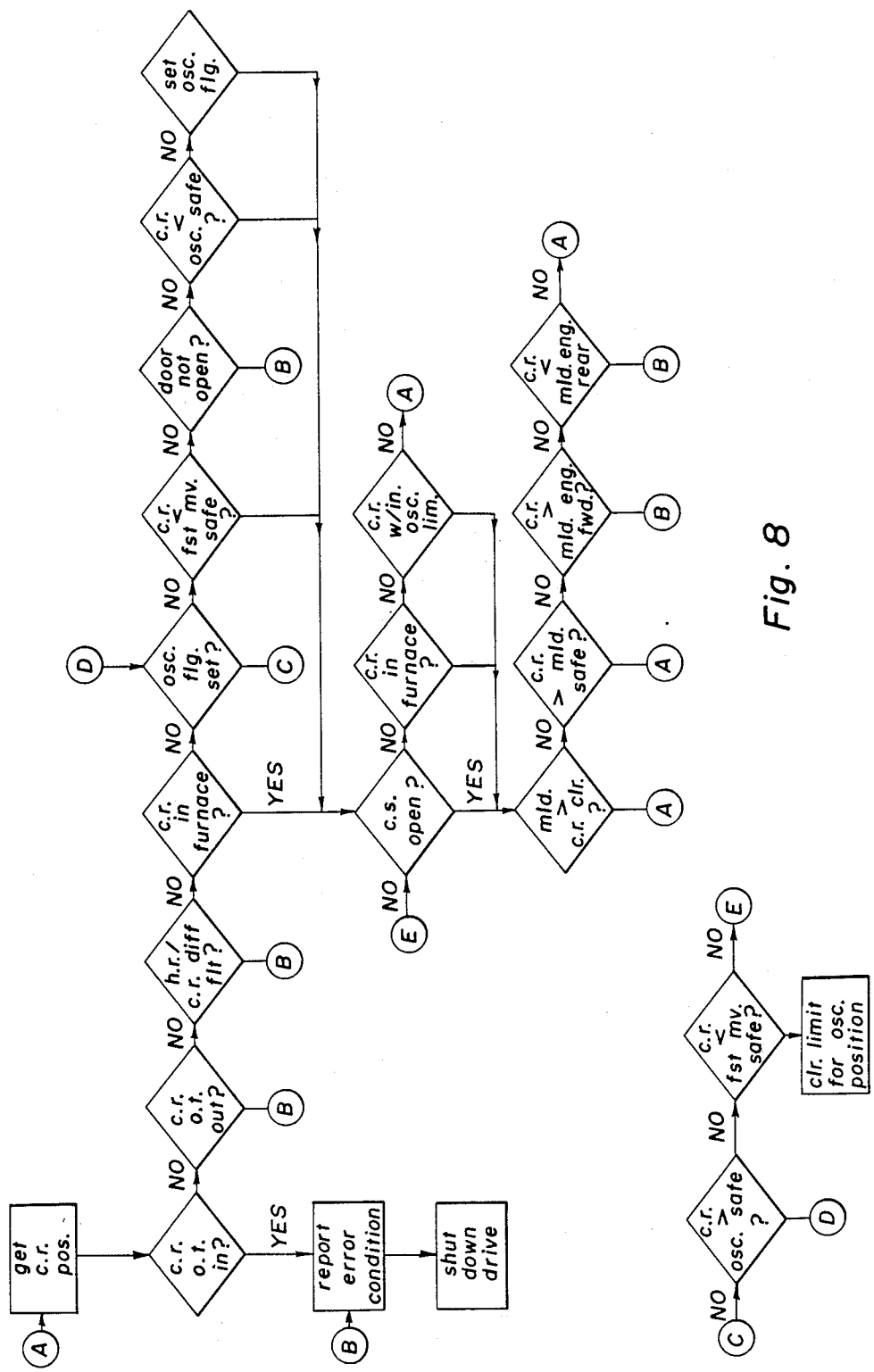
FIG. 8 is a flow chart detailing the functions performed by the controller in monitoring potential cold ring overtravel and interference conditions.

Referring to FIGS. 5 and 8, the slave computer 52 also simultaneously monitors the above-described parameters for the cold ring 24. In addition, the system continuously monitors the position of the cold ring 24 relative to the hot ring 22 and, if the distance between the cold ring 24 and the hot ring 22 is less than a programmed Differential Value, the system reports an error condition to the master computer 56 and disconnects the power to the hot ring 22 and cold ring 24 drives.

If the cold ring 24 is in the furnace 12, the system checks the mold 26 and cold ring 24 interference parameters as described above. If the ring 24 is not in the furnace and is not oscillating (in the quench), but is in a position greater than the fast door safe position, the system checks the status of the furnace door 38. If the door is not open, the system reports an error condition to the master computer 56 and shuts down the cold ring drive 36. If the furnace door 38 is open, the system next determines whether the cold ring 24 position is less than the oscillate safe position. If the cold ring 24 position is less than the oscillate safe position, that is the cold ring 24 is positioned somewhere between the fast door safe and oscillate door safe positions, the system checks the condition of the clam shells 40, 42. If they are closed and the cold ring 24 is not within oscillate limits, the system reports an error condition to the master computer 56 and disconnects the power to the cold ring drive 36.

If the clam shells 40, 42 are open or the cold ring is determined to be within oscillate limits, the system proceeds to test the mold 26 and cold ring 24 safety parameters as described above.

Returning again to the position marked 105, if the cold ring 24 is determined not to be in the furnace 12, not to be oscillating, and if it is in a position greater than the oscillate door safe position, then the oscillate flag is set. When set, this flag indicates that the cold ring 24 is either oscillating or about to move from the furnace 12 to the clam shells 40, 42 where it may ocillate. Thus, when the oscillate flag is set, the fast door safe condition is disabled.

It will be appreciated by those skilled in the art that the purpose of establishing a fast door safe position is to ensure that the status of the furnace door 38 is checked at the point where the relatively rapidly moving cold ring 24 passes the fast door safe position on its way from its farthest point from the furnace 12 into the furnace 12. Once the cold ring 24 has moved into the furnace, the system need only be concerned with whether the relatively slower moving cold ring 24 might interfere with the furnace door 38 as it crosses the oscillate door safe position.

Thus, the various programmed parameters are continuously, and simultaneously, monitored for each of the mold 26, the cold ring 24, and the hot ring 22. Other movable components and conditions may similarly be monitored by downloading the appropriate parameters from the master computer 56 and suitably programming the slave computer 52 in a manner similar to that illustrated in FIGS. 6-8.

In the preferred embodiment, the slave computer also continuously monitors several other operating condition of the glass sheet processing system and takes the appropriate action demanded by the monitored conditions in each case.

For example, the slave computer 52 receives input relating to the condition (on or off) of the Cold Ring In Auto Switch, Hot Ring In Auto Switch, and Mold In Auto Switch. If these are on, the controller 50 is informed that the drive hardware for the associated component is also turned on.

Other examples of operating conditions continuously monitored by the slave computer in the preferred embodiment of the invention are:

The Mold And Rings Panic Stop Button—When this input is active, the operator has hit this button and the controller will automatically disconnect the power to the mold, hot ring, and cold ring drive hardware, and issue a suitable warning message to the master computer 56. This action causes the devices to stop immediately. Once this button is released, that is, when the slave computer 52 determines that it is in an inactive state, the slave computer 52 automatically forces each of the mold 26, hot ring 22, and cold ring 24 to their setup positions. This action is referred to as a "bender reset".

Mold And Rings Disconnect—In an open position, this input informs the slave computer 52 that power to the mold and rings, drives has been disconnected by the operator, and a report of this condition is sent to the master computer 56. In a closed condition, this input informs the slave computer 52 that power has been connected to the devices by the operator. The slave computer 52 will then force a bender reset.

Fault Condition Override—This input informs the controller to ignore fault conditions and leave the devices active. This override is activated by the operator and allows him to set up the glass processing system or recover from a shutdown condition without the controller 50 again automatically shutting the system down.

Clam Shell Quench Status—This input informs the slave computer 52 that the quench heads (clam shells) 40, 42 are open sufficiently to allow the cold ring to pass through them. This input, and the door open input described below, are utilized in the continuous monitoring functions described above.

Door Open—This input informs the controller that the exit door has opened to allow the cold ring 24 to pass into or out of the furnace 12. Again, if under certain conditions, the clam shells 40, 42 or the furnace door 38 are closed, the slave computer 52 may report an error condition to the master computer 56 and disconnect the power to the affected components.

Mold Drive Fault, Hot Ring Drive Fault, Cold Ring Drive Fault—Activation of any of these inputs informs the controller that the drive hardware has failed for the associated component. The slave computer 52 automatically reports an error condition to the master computer 56 and forces a bender reset.

Mold Drive Overload, Hot Ring Drive Overload, Cold Ring Drive Overload—This input, when activated, informs the slave computer 52 that the drive hardware for the associated component is overloaded and will shut down if the problem is not fixed. The slave computer 52 automatically reports error condition to the master computer 56 when any of these inputs are activated.

This invention has been described in an illustrative manner and it is to be understood that the terminology which has been used is intended to be in the nature of words of description rather than limitation. A greater understanding of the present invention and of control systems for glass sheet processing systems in general may be obtained by referring to applicants' U.S. patent application for "Position Controller For Glass Sheet Processing Systems", Docket No. P-422, which is being filed concurrently herewith.

Many modifications and variations of the present invention are possible in light of the above teachings. It is, therefore, to be understood that within the scope of the appended claims, the invention may be practiced otherwise than as specifically described.

What is claimed is:

1. In a glass sheet processing system, including one or more movable components each driven by a variable speed drive, a controller for monitoring one or more of the movable components and for operation with a central control system including a master computer, the controller comprising:
   a position encoder associated with each of the movable components monitored by the system; and
   a slave computer including
   two-way communications means for receiving data signals corresponding to preselected position parameters for each of the movable components monitored by the system, said data signals being downloaded from the master computer, and for sending messages to the master computer,
   a position input associated with each position encoder for receiving current position data of the movable components, and
   logic for continuously monitoring the current position data, comparing the current position data to the preselected position parameters for the movable components, and if certain preselected conditions are determined to exist, sending a preselected error condition message to the master computer.

2. The controller of claim 1 wherein the slave computer includes dynamic memory for storing the preselected position parameters downloaded from the master computer prior to or during the operating of the glass sheet processing system.

3. The controller of claim 1 including:
   a power switch connected to the power line associated with at least one of the movable components being monitored by the controller, said power switch being capable of disconnecting the power to the variable speed drive of the movable component; and
   logic for generating a signal to the power switch associated with an affected movable component, disconnecting the power to the variable speed drive whenever said certain preselected conditions are determined to exist.

4. The controller of claim 1 wherein the position encoders are digital incremental position encoders.

5. The controller of claim 1 wherein the slave computer further includes:
   status inputs associated with one or more selected components for receiving signals corresponding to the current operating condition of each of the selected components;
   dynamic memory for storing preselected conditions to the current operating condition of the selected components and generating a preselected condition message to the master computer whenever the condition of one of the selected components is determined to be in the preselected condition.

6. In a glass sheet processing system, including one or more movable components each driven by a variable speed drive, a controller for monitoring one or more of the movable components and for operation with a central control system including a master computer, the controller comprising:
   a power switch connected to the power line interconnecting a power source and at least one of the movable components being monitored by the controller, said power switch being capable of disconnecting the power to the variable speed drive of the movable components;
   a position encode associated with each of the movable components monitored by the system; and
   a slave computer including
   two-way communication means for receiving data signals corresponding to preselected position parameters for each of the movable components monitored by the system, and for sending message to the master computer,
   a position input associated with each position encoder for receiving current position data of the movable components; and
   logic for continuously monitoring the current position data, comparing the current position data to the preselected position parameters for the movable components, and, if certain preselected conditions are determined to exist, generating a signal to the power switch the variable speed drive, thereby preventing further operation of the movable components.

7. The controller of claim 6 wherein the slave computer includes dynamic memory for storing the preselected position parameters downloaded from the master computer prior to or during operation of the glass sheet processing system.

8. The controller of claim 6 including logic for outputting a preselected error condition message to the master computer whenever said certain preselected conditions are determined to exist.

9. The controller of claim 6 wherein the position encoders ar digital incremental position encoders.

10. The controller of claim 6 wherein the slave computer further includes:
   status inputs associated with one or more selected components for receiving signals corresponding to the current operating condition of each of the selected components;
   dynamic memory for storing preselected conditions for the selected components; and
   logic for comparing the preselected conditions to the current operating condition of the selected components and generating a preselected condition message to the master computer whenever the condition of one of the selected components is determined to be in the preselected condition.

* * * * *

UNITED STATES PATENT AND TRADEMARK OFFICE
CERTIFICATE OF CORRECTION

PATENT NO. : 4,825,376

DATED : April 25, 1989

INVENTOR(S) : Gary D. Brinker et al

It is certified that error appears in the above-identified patent and that said Letters Patent is hereby corrected as shown below:

Column 3, Line 61, "portion"
should be --position--.

Column 3, Line 67, before
"means" delete the --,--, and after "means" delete the ")".

Column 5, Line 6, after
"slave" insert --computer--.

Column 6, Line 23, after
"these" insert --switches--.

Column 7, Line 10, after
"reports" insert --this--.

Column 8, Line 10, Claim 5, after "conditions"
insert --for the selected components; and logic for
comparing the preselected conditions--.

Column 8, Line 26, Claim 6, "encode" should be
--encoder--.

UNITED STATES PATENT AND TRADEMARK OFFICE
CERTIFICATE OF CORRECTION

PATENT NO. : 4,825,376

DATED : April 25, 1989

INVENTOR(S) : Gary D. Brinker et al

It is certified that error appears in the above-identified patent and that said Letters Patent is hereby corrected as shown below:

> Column 8, Line 41, Claim 6, after "switch" insert
> --disconnecting the power to--.

Signed and Sealed this

Twenty-ninth Day of October, 1991

Attest:

HARRY F. MANBECK, JR.

*Attesting Officer*  *Commissioner of Patents and Trademarks*